(12) United States Patent
Yi et al.

(10) Patent No.: US 8,874,241 B2
(45) Date of Patent: Oct. 28, 2014

(54) MASTER-SLAVE SYSTEM USING 4-DOF PARALLEL MECHANISM

(75) Inventors: Byung-Ju Yi, Bucheon-si (KR);
Jaeheon Chung, Gwangju (KR);
Hyo-Jeong Cha, Ansan-si (KR)

(73) Assignee: IUCF-HYU (Industry-University Cooperation Foundation Hanyang University) (KR)

( * ) Notice: Subject to any disclaimer, the term of this patent is extended or adjusted under 35 U.S.C. 154(b) by 671 days.

(21) Appl. No.: 13/173,433

(22) Filed: Jun. 30, 2011

(65) Prior Publication Data

US 2012/0053701 A1    Mar. 1, 2012

(30) Foreign Application Priority Data

Aug. 27, 2010    (KR) .................. 10-2010-0083683

(51) Int. Cl.
| | | |
|---|---|---|
| *G05B 19/19* | (2006.01) | |
| *B25J 13/02* | (2006.01) | |
| *B25J 9/00* | (2006.01) | |
| *B25J 13/04* | (2006.01) | |
| *B25J 17/02* | (2006.01) | |
| *B25J 9/16* | (2006.01) | |

(52) U.S. Cl.
CPC .............. *B25J 13/025* (2013.01); *B25J 9/0048* (2013.01); *B25J 13/04* (2013.01); *B25J 17/0266* (2013.01); *B25J 9/1689* (2013.01)
USPC ................................................ 700/3; 700/85

(58) Field of Classification Search
CPC ..................... G05B 2219/2231; Y10S 414/13; B25J 9/106
USPC .................................................. 700/3, 83, 85
See application file for complete search history.

(56) References Cited

U.S. PATENT DOCUMENTS

5,657,584 A * 8/1997 Hamlin .......................... 52/81.3

FOREIGN PATENT DOCUMENTS

| JP | 2005212079 | 8/2005 |
|---|---|---|
| KR | 1020090061508 | 6/2009 |

OTHER PUBLICATIONS

Park et al., "Design and Analysis of a New Parallel Grasper Having Spherical Motion", 2004 IEEE.*

* cited by examiner

*Primary Examiner* — Carlos Ortiz Rodriguez
(74) *Attorney, Agent, or Firm* — Cantor Colburn LLP (57) ABSTRACT

A master-slave system using a 4-degree of freedom (DOF) parallel mechanism includes: a master device having a 4-DOF parallel mechanism which generates 1-DOF translation and 3-DOF rotation by the manipulation of a user; a slave device having a 4-DOF parallel mechanism which generates 1-DOF translation and 3-DOF rotation according to the movement of the master device; and a controller for receiving a behavior signal generated by the master device and outputting a driving signal to the slave device so that the slave device moves according to the movement of the master device. The master-slave system may be utilized as a remote needling robot with excellent manipulation and precision.

15 Claims, 6 Drawing Sheets

MASTER-SLAVE SYSTEM USING 4-DOF PARALLEL MECHANISM

CROSS-REFERENCE TO RELATED APPLICATION

This application claims priority to Korean Patent Application No. 10-2010-0083683, filed on Aug. 27, 2010, and all the benefits accruing therefrom under 35 U.S.C. §119, the contents of which in its entirety are herein incorporated by reference.

TECHNICAL FIELD

This disclosure relates to a master-slave system using a 4-degree of freedom (DOF) parallel mechanism, and more particularly, to a master-slave system using a 4-DOF parallel mechanism which is economic by decreasing the number of drivers and sensors and ensures excellent manipulation and precision.

BACKGROUND

Recently, as the fields of precise part fabrication and processing, semiconductor fabrication, microsurgery, gene manipulation, cell coordination and so on are more consumed and highlighted in the industries, medical circles and gene engineering, the study for developing and utilizing robots for precise works is very active.

A serial robot with an open link is one of manipulators widely used in the industries. The series robot allows a large working space and good workability, but it has bad precision since errors are accumulated at a terminal device due to drivers connected in series. In addition, the series robot has a drawback in that its dynamic efficiency is deteriorated during a high-speed work or while a load is greatly changing.

As an alternative for overcoming the drawback of the series robot, a parallel mechanism has been actively studied from 1980. The parallel mechanism has a closed chain, so its work place is relatively small. However, errors of the terminal devices are not accumulated due to drivers, and it may operate excellently even during a high-speed work or while a dynamic load is greatly changing due to high structural rigidity. Therefore, the parallel mechanism is more advantageous for precise working than the series mechanism.

The parallel mechanisms developed so far have terminals whose degree of freedom (DOF) is 3 or 6. Such DOF is deficient or excessive in comparison to DOF required for demanded works such as needling, and therefore the parallel mechanisms are inefficient and unsuitable for works such as needling in a 3D space.

Meanwhile, a haptic device for interaction between remote robot manipulation and virtual environment is actively studied recently. The haptic device is a bidirectional interface which plays a role of an input device for inputting the movement of a user to a controller of a system and a role of an output device for transferring a suitable force or touch to the body of a user according to an instruction of the controller.

Haptic devices are configured to use a handle connected to a terminal of a robot. Therefore, the haptic devices also have sensors and motors at every joint, measure position and posture of the terminal of the robot by the movement of the handle, and generate a force and torque of the terminal by driving a motor.

Forward kinematics which allows obtaining position and posture of the terminal from the location information of active joints is important so that the robot may be used by means of the haptic device. However, the haptic device using the series mechanism has the sensor and motor mounted to each joint, and therefore the motor is moved along with the moving haptic device. The movement of the motor increases the inertia of the device, which obstacles the movement of the user and increases the fatigue of the user.

In addition, if a master device used as the haptic device and a slave device driven by the master device have different DOFs, it is difficult to match working spaces of both devices. Therefore, in order to realize an efficient haptic device, it is demanded that the master device used as the haptic device has the same DOF as the slave device for the working space.

SUMMARY

This disclosure is to provide a master-slave system using a 4-degree of freedom (DOF) parallel mechanism which decreases the number of drivers and sensors and ensures excellent manipulation and precision by using the 4-DOF parallel mechanism.

In one general aspect, this disclosure provides a master-slave system using a 4-DOF parallel mechanism, which includes:

a master device including a 4-DOF parallel mechanism which generates 1-DOF translation and 3-DOF rotation by the manipulation of a user;

a slave device including a 4-DOF parallel mechanism which generates 1-DOF translation and 3-DOF rotation according to the movement of the master device; and a controller for receiving a behavior signal generated by the master device and outputting a driving signal to the slave device so that the slave device moves according to the movement of the master device.

The master device may include a master base; an input unit spaced apart from the master base; a spherical mechanism connected between the master base and the input unit so that the input unit makes 3-DOF rotation with respect to the master base; and a parallel link unit connected to the input unit so that the input unit makes 1-DOF translation with respect to the master base, and the slave device may include a slave base; a driving unit spaced apart from the slave base; a parallel link unit connected between the slave base and the driving unit so that the driving unit makes 3-DOF rotation and 1-DOF translation with respect to the slave base; and a guide link unit for guiding the translation of the driving unit.

The spherical mechanism may include four accessory chains, each of the accessory chains may include two links and three rotating joints, and rotation axes of the rotating joints of each accessory chain may cross each other at one point.

The translation link unit may include one sliding joint which has a rack and a pinion engaged with each other.

A measuring means for measuring 1-DOF translation momentum of the master device may be provided to the parallel link unit.

A driving means for enforcing the master device to make 1-DOF translation may be installed to the parallel link unit.

A measuring means for measuring 3-DOF rotation momentum of the master device may be provided to the spherical mechanism.

A driving means for enforcing the master device to make 3-DOF rotation may be installed to the spherical mechanism.

The parallel link unit may include four accessory chains, each of the accessory chains may have one active sliding joint connected to the slave base by means of a ball joint and connected to the driving unit by means of a universal joint, and the ball joints of the accessory chains may be asymmetrically arranged at the slave base.

The guide link unit may include one sliding joint connected to the slave base by means of a ball joint and fixed to the driving unit.

A handle gripped by a user may be formed at the input unit.

The slave device may further include a needle, an insertion posture of the needle may determined according to 3-DOF rotation of the master device, and an insertion degree of the needle may be determined according to 1-DOF translation of the master device.

The master-slave system may further include a force measuring means for measuring a force applied to a front end of the needle.

The slave device may further include a needle inserting machine for controlling the insertion degree of the needle, and the needle inserting machine may have one active sliding joint.

The controller may receive a measurement signal from the force measuring means and further output a reaction signal for driving the master device.

The master device may move in a direction opposite to the 1-DOF translating direction according to the reaction signal.

Other features and aspects will be apparent from the following detailed description, the drawings, and the claims.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

Hereinafter, preferred embodiments of this disclosure will be described in detail. However, these embodiments are just for better understanding of this disclosure, and it would be apparent to those having ordinary skill in the art that this disclosure is not limited to the embodiments.

Figure 1:
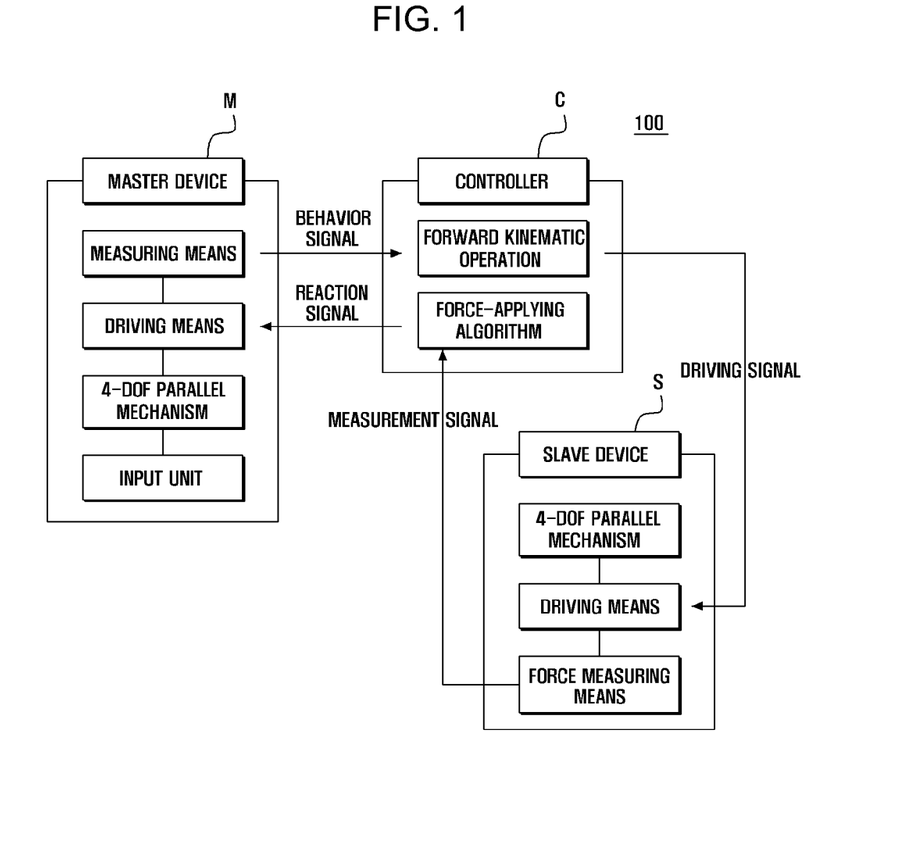
FIG. 1 is a block diagram showing a master-slave system using a 4-degree of freedom (DOF) parallel mechanism according to one embodiment of this disclosure.

FIG. 1 is a block diagram showing a master-slave system using a 4-degree of freedom (DOF) parallel mechanism according to one embodiment of this disclosure.

Referring to FIG. 1, the master-slave system 100 using a 4-DOF parallel mechanism according to one embodiment of this disclosure includes a master device M having a 4-DOF parallel mechanism which generates 1-DOF translation and 3-DOF rotation by the manipulation of a user; a slave device S having a 4-DOF parallel mechanism which generates 1-DOF translation and 3-DOF rotation by the movement of the master device; and a controller C for receiving a behavior signal generated by the master device and outputting a driving signal to the slave device so that the slave device moves along the movement of the master device.

In other words, if the user manipulates the master device M, the controller calculates user position and posture information by forward kinematic operation from the behavior signal including a rotation value (3-DOF rotating momentum) of a rotating joint and a displacement value (1-DOF translating momentum) of a sliding joint, measured by a measuring means, and transmits a driving signal to the slave device. In addition, if it is required to apply a force, the slave device S transmits a force-applying instruction to the controller by means of a measurement signal obtained by a force measuring means, and the controller outputs a reaction signal to a driving means of the master device M through a force-applying algorithm so that the user feels force sense.

The controller C is connected to the master device M and the slave master S wiredly or wirelessly.

Figure 2:
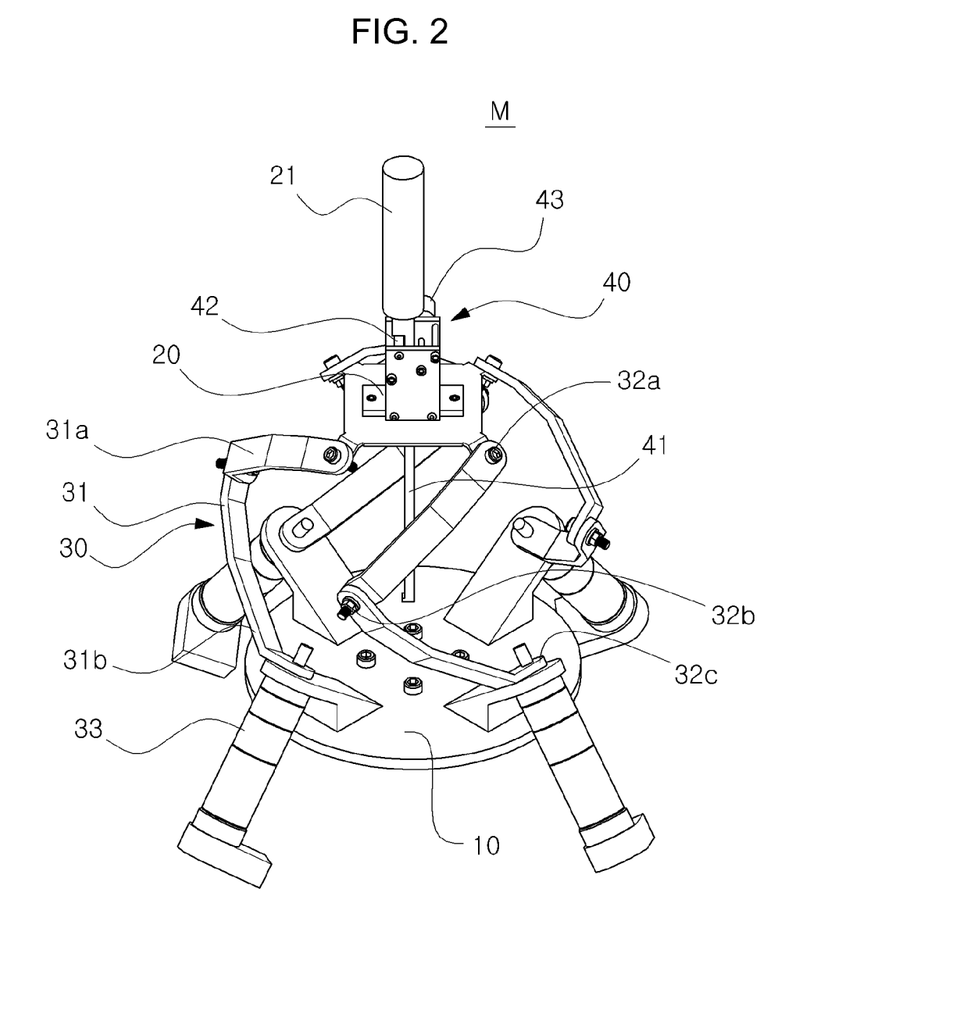
FIG. 2 is a perspective view showing a master device according to one embodiment of this disclosure.
Figure 3:
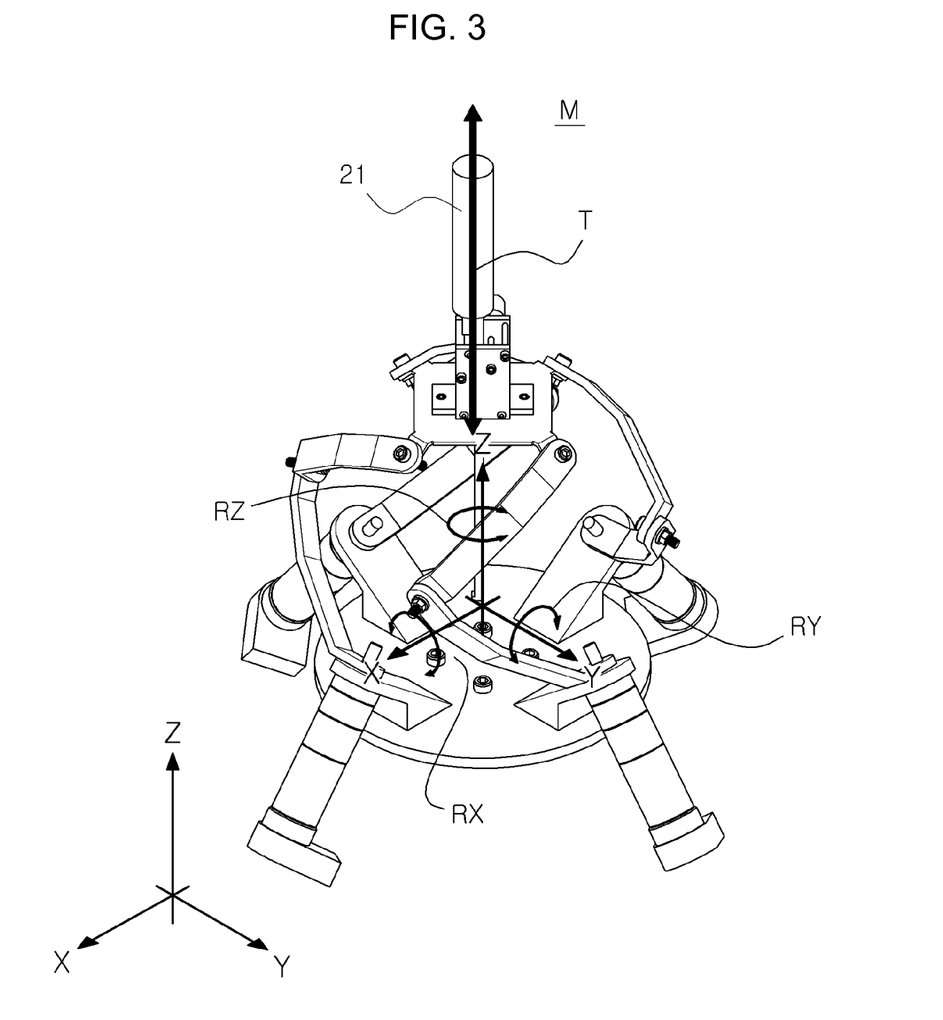
FIG. 3 is a perspective view showing the movement of the master device according to one embodiment of this disclosure.

FIG. 2 is a perspective view showing the structure of the master device according to one embodiment of this disclosure, and FIG. 3 is a perspective view showing the movement of the master device according to one embodiment of this disclosure.

Referring to FIG. 2, the master device M of this disclosure includes a master base 10, an input unit 20 spaced apart from the master base, a spherical mechanism 30 connected between the master base and the input unit so that the input unit may make 3-DOF rotation with respect to the master base, and a translating link unit 40 connected to the input unit so that the input unit may make 1-DOF translation with respect to the master base.

The spherical mechanism 30 is a mechanism configured so that the 4-DOF parallel mechanism of the master device may rotate with 3 DOF, and the spherical mechanism 30 includes four accessory chains 31. Each accessory chain includes two links 31a and 31b and three rotating joints 32a, 32b and 32c. In addition, rotation axes of the rotating joints respectively cross each other at one point. Therefore, if a user manipulates the master device M using the input unit 20, the rotating joints 32a, 32b and 32c of the accessory chain 30 are pivoted to make a spherical mechanism, and the master device M may generate three-directional rotations accordingly. The rotation axes of the rotating joints always cross at one point while the rotating joints are rotating, and therefore the above 3-DOF rotations may be realized.

Meanwhile, a measuring means (not shown) is provided to the rotating joint 32a of the accessory chain 31 which is connected to the master base 10 so as to measure a rotation value of the rotating joint. This rotation value means 3-DOF rotating momentum of the master device and is converted into a driving signal of the slave device by the controller.

In addition, a driving means (for example, a motor) 33 may be connected to the rotating joint which is provided with the measuring means, and may be fixed to the master base 10.

The accessory chain may be configured to actively move by inputting a suitable driving signal to the driving means 33, and in this process a force sense may be transferred to the user who manipulates the master device. For example, it may be utilized for realizing a virtual wall which informs the user that the user whose manipulates the master device gets out of a working place. In other words, it is possible to apply a virtual spring-damper to the master device by using a location value of an end-effector attached to the master device and to transmit a force sense to the user by converting into a torque of the driving means 33 of the master device by means of a force-applying algorithm.

The translating link unit 40 is a mechanism configured so that the 4-DOF parallel mechanism of the master device may make 1-DOF translation, and the translating link unit 40 includes one sliding joint. The sliding joint may be implemented using a rack 41 and a pinion 42 which are engaged with each other, and the mechanism for implementing the sliding joint is not limited thereto.

Meanwhile, a measuring means (not shown) may be provided to the rotary shaft of the pinion 42 of the translating link unit so as to measure a displacement value (1-DOF translating momentum) of the sliding joint. This displacement value is converted into a driving signal of the slave device by the controller.

In addition, a driving means 43 may be connected to the rotary shaft of the pinion 42 of the translating link unit, and the pinion 42 may be driven by the driving means so that the input unit 20 actively moves for 1-DOF translation. This driving means may also be used to transmit the force applied at the front end of a needle attached to the slave device to the user so that the user feels a force sense, as described later.

A handle 21 which may be gripped by the user is formed at the input unit 20, and the user may intuitively adjust the slave device into a desired direction or location by means of the handle 21.

Referring to FIG. 3, when the user grips and moves the handle 21, the rotating joints of each accessory chain of the spherical mechanism are pivoted while keeping 90 degrees between them, and therefore the rotating joints may generate 3-DOF rotations RX, RY and RZ. In addition, the user may generate 1-DOF translation T by pushing or pulling the handle 21 by means of the sliding joint of the translating link unit connected to the input unit.

Figure 4:
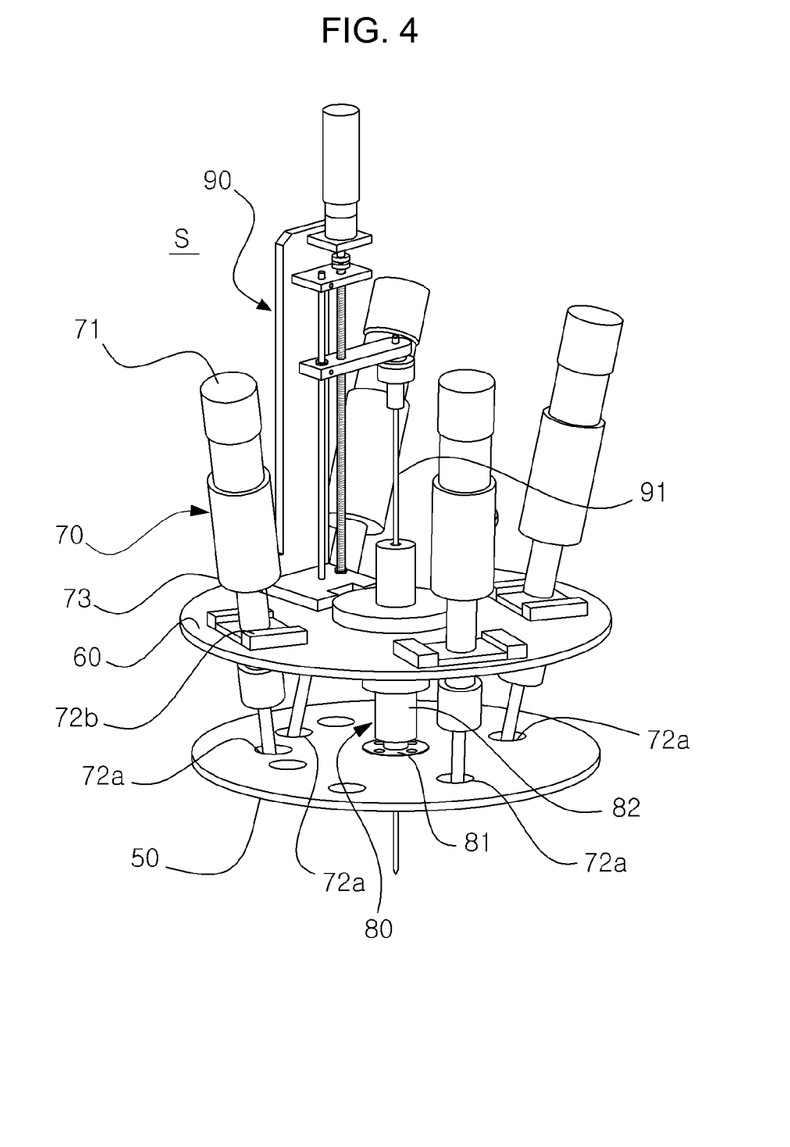
FIG. 4 is a perspective view showing a slave device according to one embodiment of this disclosure.
Figure 5:
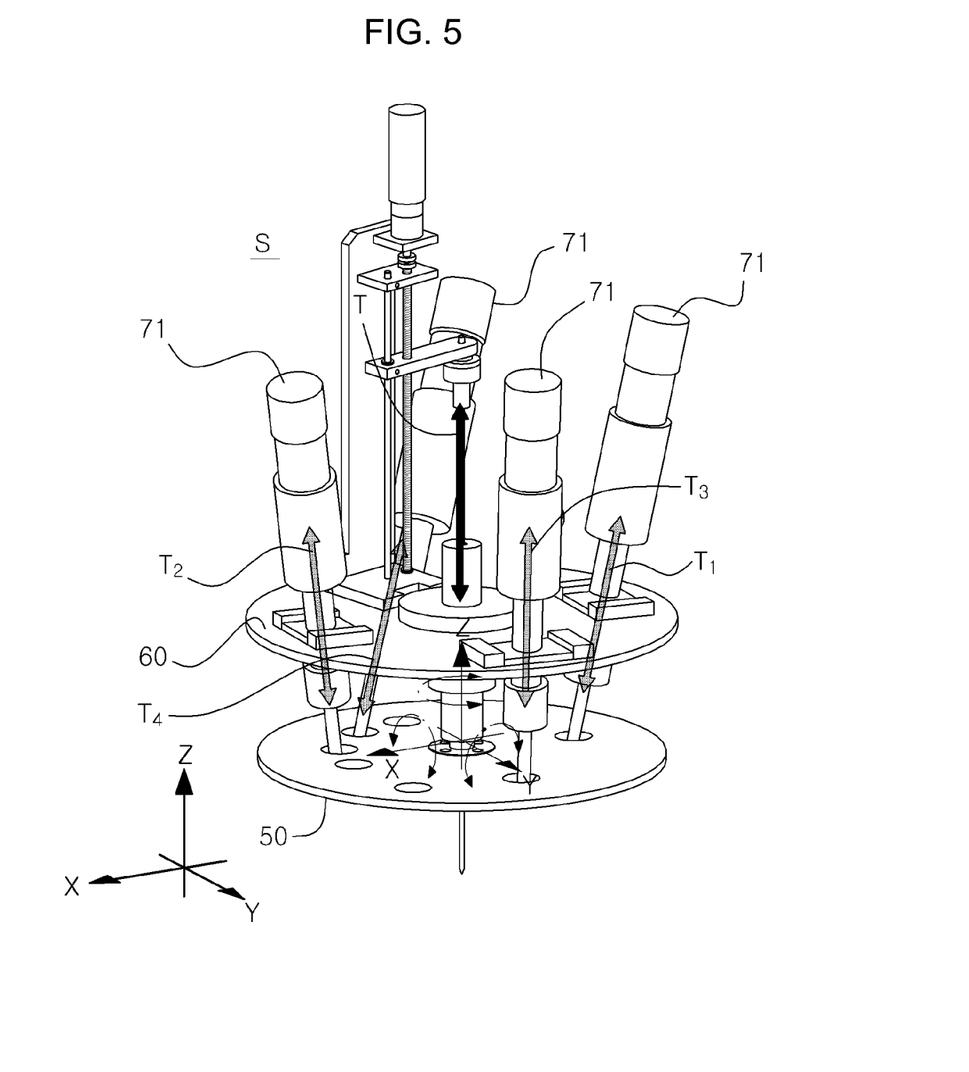
FIG. 5 is a perspective view showing the movement of the slave device according to one embodiment of this disclosure.
Figure 6:
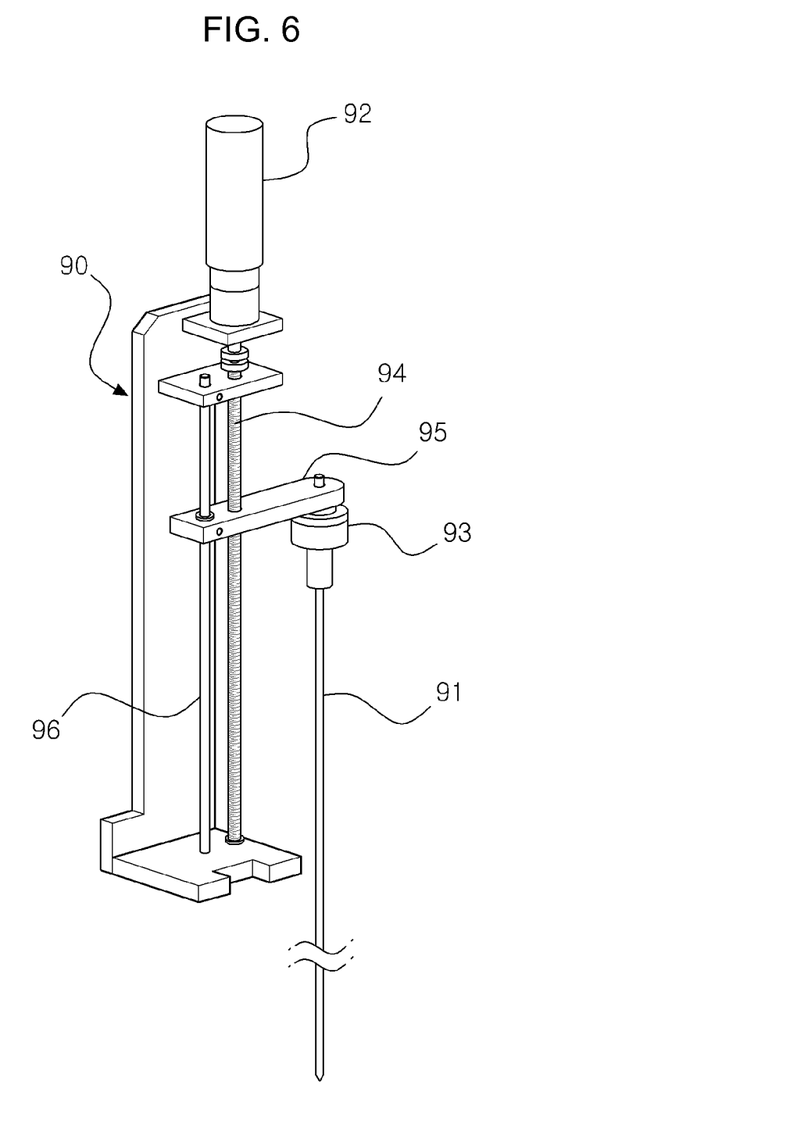
FIG. 6 is a schematic perspective view showing a needle inserting machine according to one embodiment of this disclosure.

FIG. 4 is a perspective view showing the slave device according to one embodiment of this disclosure, FIG. 5 is a perspective view showing the movement of the slave device according to one embodiment of this disclosure, and FIG. 6 is a schematic perspective view showing a needle inserting machine which may be attached to the slave device.

Referring to FIG. 4, the slave device S according to this disclosure includes a slave base 50, a driving unit 60 spaced apart from the slave base, a parallel link unit 70 connected between the slave base and the driving unit so that the driving unit may make 3-DOF rotation and 1-DOF translation with respect to the slave base, and a guide link unit 80 for guiding the translation of the driving unit. In addition, a needle 91 may be attached to the slave device S, and the slave device S may insert the needle into a specific portion in response to the manipulation of the master device M by the user.

The parallel link unit 70 is a link structure for connection between the slave base 50 attached to another mechanism to fix the inserted location of the needle 91 and the driving unit 60 dependently moving according to the input of the master device. The parallel link unit 70 includes four accessory chains 71. Both ends of each chain are rotatably connected to the slave base 50 and the driving unit 60, respectively, and both ends of each accessory chain may be connected to the slave base by a ball joint 72a and to the driving unit by a universal joint 72b.

The ball joints 72a disposed at the slave base 50 are asymmetrically arranged in order to escape an unprecedented phenomenon of the parallel link unit and to ensure a greatest working space.

Each accessory chain 71 of the parallel link unit includes one active sliding joint 73. The active sliding joint 73 may be driven by, for example, a driving motor and a link which moves along the rotary shaft of the driving motor. In other words, each accessory chain may generate 1-DOF translation by giving a driving signal to the driving motor.

The guide link unit 80 is rotatably connected to the slave base 50 and is fixed to the driving unit 60. Specifically, the guide link unit 80 may be rotatably connected to the slave base 50 by means of a ball joint 81. In addition, the guide link unit 80 includes one sliding joint 82. By means of the guide link unit 80 configured as above, the two-directional translation of the slave device S may be restrained. The sliding joint may be implemented by a combination of bolt and nut, which are screwed to allow autonomous running.

A guide hole for giving a passage for the needle is formed in the guide link unit 80, and a hole communicating with the guide hole is also formed in the ball joint 81. Therefore, the needle 91 may be mounted through the guide hole of the guide link unit and through the hole in the ball joint 81.

Since the needle is inserted through the guide link unit 80 as described above, the guide link unit 80 also plays a role of guiding the needle. Therefore, the guide link unit 80 may be installed at the center of the driving unit and the slave base.

Referring to FIG. 5, four accessory chains 71 independently make 1-DOF translations $T_1$, $T_2$, $T_3$, and $T_4$ according to a driving signal input to the driving means as indicated by arrows so that the driving unit 60 may make 3-DOF rotation, and four accessory chains 71 makes translations so that the driving unit 60 may make 1-DOF translation T.

The process of inserting a needle at the slave device by using the master device is as follows. The slave device is pivoted corresponding to the rotation of the input unit of the master device so that an insertion posture of the needle may be determined, and the slave device makes a translation corresponding to the translation of the input unit of the master device so that an insertion degree of the needle may be determined.

In order to control the insertion degree of the needle of the slave device more precisely, a needle inserting machine 90 having a driving means may be installed to the driving unit 60. In other words, the insertion degree of the needle may be more precisely controlled by a control motor 92 installed to the needle inserting machine 90.

The needle inserting machine 90 includes a control motor 92, a rotating screw shaft 94 rotatably connected to the output shaft of the control motor, a fixed shaft 96 spaced apart from the rotating screw shaft in parallel, and a movable body 95 which is movable in an axial direction along the rotating screw shaft and the fixed shaft. The movable body 95 is screwed with the rotating screw shaft 94 to configure an active sliding joint which moves along the axial direction of the rotating screw shaft when the rotating screw shaft is rotating. In addition, the needle 91 is attached to one side of the movable body 95.

Meanwhile, a force measuring means 93 for measuring the force applied to the front end of the needle may be installed at the terminal of the needle. The force measuring means 93 may be, for example, a one-axis road cell, which measures the force when the needle 91 is inserted into a specific portion. The force measuring means 93 may be attached to the movable body to move along with the needle.

The force applied to the front end of the needle while the needle 91 is inserted through the slave device S may be transferred to the user by inversely driving the master device by means of the controller. In other words, the controller may scale the force measured by the force measuring means 93 at a certain ratio and then output a reaction signal for driving the master device. This reaction signal is transmitted to the driving means 43 installed at the parallel link unit of the master device, and the master device moves in a direction opposite to the 1-DOF translating direction accordingly. In addition, the user may feel the force applied to the needle through the handle 21 when the needle is inserted. As described, the force applied to the slave device is reflected on the input unit of the master device so that the user may directly feel the situation at the front end of the needle when the needle is inserted. Therefore, the user may perform more precise works.

The master-slave system using a 4-DOF parallel mechanism according to this disclosure may be utilized as a remote needling robot with 4 DOF, where all of 6 DOF is not necessary, and it may be developed as an economic master-slave system since it uses a small number of driving means and measuring means. In addition, since the master-slave system is implemented using a parallel mechanism, manipulation and precision are more excellent in comparison to a series mechanism.

Simple changes or modifications of this disclosure can be easily made by those having ordinary skill in the art, and these changes and modifications should be recognized to be included in the scope of this disclosure.

What is claimed is:

1. A master-slave system using a 4-degree of freedom (DOF) parallel mechanism, comprising:
    a master device including a 4-DOF parallel mechanism which generates 1-DOF translation and 3-DOF rotation by the manipulation of a user;
    a slave device including a 4-DOF parallel mechanism which generates 1-DOF translation and 3-DOF rotation according to the movement of the master device; and
    a controller for receiving a behavior signal generated by the master device and outputting a driving signal to the slave device so that the slave device moves according to the movement of the master device,
    wherein the master device includes:
    a master base;
    an input unit spaced apart from the master base;
    a spherical mechanism connected between the master base and the input unit so that the input unit makes 3-DOF rotation with respect to the master base; and
    a translation link unit connected to the input unit so that the input unit makes 1-DOF translation with respect to the master base,
    wherein the slave device includes:
    a slave base;
    a driving unit spaced apart from the slave base;
    a parallel link unit connected between the slave base and the driving unit so that the driving unit makes 3-DOF rotation and 1-DOF translation with respect to the slave base; and
    a guide link unit for guiding the translation of the driving unit.

2. The master-slave system using a 4-DOF parallel mechanism according to claim 1,
    wherein the spherical mechanism includes four accessory chains,
    wherein each of the accessory chains includes two links and three rotating joints, and
    wherein rotation axes of the rotating joints of each accessory chain cross each other at one point.

3. The master-slave system using a 4-DOF parallel mechanism according to claim 1, wherein the translation link unit includes one sliding joint which has a rack and a pinion engaged with each other.

4. The master-slave system using a 4-DOF parallel mechanism according to claim 1, wherein a measuring means for measuring 1-DOF translation momentum of the master device is provided to the parallel link unit.

5. The master-slave system using a 4-DOF parallel mechanism according to claim 1, wherein a driving means for enforcing the master device to make 1-DOF translation is installed to the parallel link unit.

6. The master-slave system using a 4-DOF parallel mechanism according to claim 1, wherein a measuring means for measuring 3-DOF rotation momentum of the master device is provided to the spherical mechanism.

7. The master-slave system using a 4-DOF parallel mechanism according to claim 1, wherein a driving means for enforcing the master device to make 3-DOF rotation is installed to the spherical mechanism.

8. The master-slave system using a 4-DOF parallel mechanism according to claim 1,
    wherein the parallel link unit includes four accessory chains,
    wherein each of the accessory chains has one active sliding joint connected to the slave base by means of a ball joint and connected to the driving unit by means of a universal joint, and
    wherein the ball joints of the accessory chains are asymmetrically arranged at the slave base.

9. The master-slave system using a 4-DOF parallel mechanism according to claim 1, wherein the guide link unit includes one sliding joint connected to the slave base by means of a ball joint and fixed to the driving unit.

10. The master-slave system using a 4-DOF parallel mechanism according to claim 1, wherein a handle gripped by a user is formed at the input unit.

11. The master-slave system using a 4-DOF parallel mechanism according to claim 1,
    wherein the slave device further includes a needle, and
    wherein an insertion posture of the needle is determined according to 3-DOF rotation of the master device, and an insertion degree of the needle is determined according to 1-DOF translation of the master device.

12. The master-slave system using a 4-DOF parallel mechanism according to claim 11, further comprising a force measuring means for measuring a force applied to a front end of the needle.

13. The master-slave system using a 4-DOF parallel mechanism according to claim 11,
    wherein the slave device further includes a needle inserting machine for controlling the insertion degree of the needle, and
    wherein the needle inserting machine has one active sliding joint.

14. The master-slave system using a 4-DOF parallel mechanism according to claim 12, wherein the controller receives a measurement signal from the force measuring means and further outputs a reaction signal for driving the master device.

15. The master-slave system using a 4-DOF parallel mechanism according to claim 14, wherein the master device moves in a direction opposite to the 1-DOF translating direction according to the reaction signal.

* * * * *